(12) United States Patent
Liou et al.

(10) Patent No.: US 8,212,941 B2
(45) Date of Patent: Jul. 3, 2012

(54) DIGITIZED ANALOG TV SIGNAL PROCESSING SYSTEM

(75) Inventors: Ming-Luen Liou, Taipei County (TW);
Ray-Kuo Lin, Taipei County (TW);
Yi-Fu Chen, Taipei (TW)

(73) Assignee: Mediatek Inc., Hsin-Chu (TW)

(*) Notice: Subject to any disclaimer, the term of this patent is extended or adjusted under 35 U.S.C. 154(b) by 1085 days.

(21) Appl. No.: 12/112,052

(22) Filed: Apr. 30, 2008

(65) Prior Publication Data

US 2009/0273714 A1  Nov. 5, 2009

(51) Int. Cl.
*H04N 5/455* (2006.01)
(52) U.S. Cl. ....................................... 348/726
(58) Field of Classification Search .................. 348/726
See application file for complete search history.

(56) References Cited

U.S. PATENT DOCUMENTS

| | | | |
|---|---|---|---|
| 4,189,755 A * | 2/1980 | Balbes et al. ................. 348/607 |
| 4,710,814 A | 12/1987 | Gassmann et al. |
| 4,918,532 A * | 4/1990 | O'Connor ...................... 348/726 |
| 5,111,160 A * | 5/1992 | Hershberger ................. 331/1 A |
| 5,161,004 A * | 11/1992 | Egger ........................... 348/555 |
| 5,339,334 A * | 8/1994 | Baghdady ...................... 375/347 |
| 5,473,375 A * | 12/1995 | Takayama et al. ............ 348/364 |
| 5,671,253 A * | 9/1997 | Stewart ......................... 375/316 |
| 5,758,271 A * | 5/1998 | Rich et al. ................... 455/234.1 |
| 5,808,671 A * | 9/1998 | Maycock et al. ............. 348/180 |
| 5,953,071 A * | 9/1999 | Van Zon ....................... 348/544 |
| 5,986,720 A * | 11/1999 | Kishigami et al. ............ 348/725 |
| 6,005,640 A * | 12/1999 | Strolle et al. ................. 348/726 |
| 6,091,931 A * | 7/2000 | Ben-Efraim et al. ........ 455/3.02 |
| 6,285,401 B1* | 9/2001 | Griepentrog ................... 348/380 |
| 6,389,070 B1* | 5/2002 | Cugnini et al. ............... 375/232 |
| 6,577,348 B1* | 6/2003 | Park .............................. 348/554 |
| 6,882,373 B2* | 4/2005 | Hong et al. ................... 348/726 |
| 7,123,305 B2* | 10/2006 | Shirahama et al. .......... 348/466 |
| 7,782,401 B1* | 8/2010 | Chou ............................. 348/581 |
| 2002/0008788 A1* | 1/2002 | Talmola et al. ............... 348/732 |
| 2003/0007672 A1* | 1/2003 | Harman et al. ............... 382/128 |
| 2003/0026363 A1* | 2/2003 | Stoter et al. .................. 375/345 |
| 2006/0001779 A1* | 1/2006 | Favrat et al. .................. 348/725 |
| 2006/0017856 A1* | 1/2006 | Sheng et al. .................. 348/725 |
| 2006/0078072 A1* | 4/2006 | Cheon et al. .................. 375/326 |
| 2006/0239389 A1* | 10/2006 | Coumou ........................ 375/346 |

(Continued)

FOREIGN PATENT DOCUMENTS

CN  1335560  2/2002

(Continued)

OTHER PUBLICATIONS

English abstract of JP2003152572, pub. May 23, 2003.

(Continued)

*Primary Examiner* — Brian Pendleton
*Assistant Examiner* — Jonathan V Lewis
(74) *Attorney, Agent, or Firm* — Thomas|Kayden

(57) ABSTRACT

A digitized analog television signal processing system is disclosed, comprising an analog-to-digital converter, a demodulation unit, a decoding unit, and a control unit. The analog-to-digital converter samples a television signal comprising a video signal. The demodulation unit demodulates the video signal. The decoding unit decodes the demodulated video signal. The control unit adjusts the demodulation unit according to a signal quality indicator generated during and/or after the decoding of the decoding unit.

18 Claims, 5 Drawing Sheets

U.S. PATENT DOCUMENTS

2008/0074497 A1* 3/2008 Kuh .............................. 348/180
2008/0225182 A1* 9/2008 Silver et al. ................... 348/726

FOREIGN PATENT DOCUMENTS

| CN | 1956522 | 5/2007 |
|---|---|---|
| GB | 2126812 | 3/1984 |
| GB | 2303278 | 12/1997 |
| JP | 2003152572 | 5/2003 |

OTHER PUBLICATIONS

K. Blair I. Benson: "Television Engineering Handbook" 1985, McGraw-Hill Book Company, XP002540895.

English language translation of abstract of CN 1335560 (published Feb. 13, 2002).

English language translation of abstract of CN 1956522 (published May 2, 2007).

* cited by examiner

DIGITIZED ANALOG TV SIGNAL PROCESSING SYSTEM

BACKGROUND OF THE INVENTION

1. Field of the Invention

The invention relates to an analog television signal processing system, and more particularly to digitized analog television signal processing systems capable of fine tuning the demodulation process of the television signal according to side information resulting from signal decoding.

2. Description of the Related Art

A television (TV) is a widely used telecommunication system for broadcasting and receiving moving pictures and sound over a distance. Commercially available since the late 1930s, the television set has become a common household communications device in homes and institutions as a source of entertainment and news. On an international conference in Stockholm in 1961, the International Telecommunications Union (ITU) has defined an identification scheme for broadcast television systems. Each monochrome TV system is assigned a letter designation (e.g., B, D, G, H, I, K, L, M, and N), which defines the characteristics of a TV signal such as video/sound modulation scheme, channel bandwidth, sound offset, frame rate, etc. Furthermore, National Television System Committee (NTSC) standard, Sequential Color with Memory (SECAM) standard, and Phase Alternating Line (PAL) standard are three widely used analog color TV standards used in a majority of countries. The NTSC standard is used in the United States, Canada, Taiwan, etc. The SECAM standard is used in France, some Africa countries (e.g., Tunisia, Madagascar and Morocco), etc. The PAL standard is used in most European countries, China, India, etc. In combination with a color analog TV system, this completely specifies all of the analog TV systems in the world (for example, PAL-B, NTSC-M, etc).

Analog TV systems have been established for decades, however, digital display devices, such as liquid crystal displays (LCDs) and plasma display panels (PDPs), have become more and more popular in recent years. Accordingly, the analog TV signal is being required to be converted to a digital TV signal via an analog-to-digital converter (ADC) and be displayed on an LCD, a PDP, or the similar.

BRIEF SUMMARY OF THE INVENTION

The invention provides a digitized analog television signal processing system. The digitized analog television signal processing system comprises an analog-to-digital converter, a demodulation unit, a decoding unit, and a control unit. The analog-to-digital converter samples a television signal comprising a video signal. The demodulation unit demodulates the video signal. The decoding unit decodes the demodulated video signal. The control unit adjusts the demodulation unit according to a signal quality indicator generated during and/or after the decoding of the decoding unit.

The television signal can further comprise a sound signal, and the digitized analog television signal processing system can further comprise a sound processing unit to demodulate and/or decode the sound signal. The signal quality indicator can be further generated during and/or after the processing of the sound processing unit.

The demodulation unit can further comprise an automatic gain controller, a carrier recovery unit, a filter bank, and an equalizer. The automatic gain controller can control a dynamic range of the television signal, and the control unit can control a loop tuning speed of the automatic gain controller according to the signal quality indicator. The carrier recovery unit can lock a video carrier of the video signal at an intermediate frequency, and the control unit can make a loop bandwidth of the carrier recovery unit controlled according to the signal quality indicator. The filter bank can separate the video signal and the sound signal from the television signal, and the control unit can adjust a bandwidth or a passband center of the filter bank according to the signal quality indicator. The equalizer can shape a frequency response of the television signal, and the control unit can control the equalizer according to the signal quality indicator.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
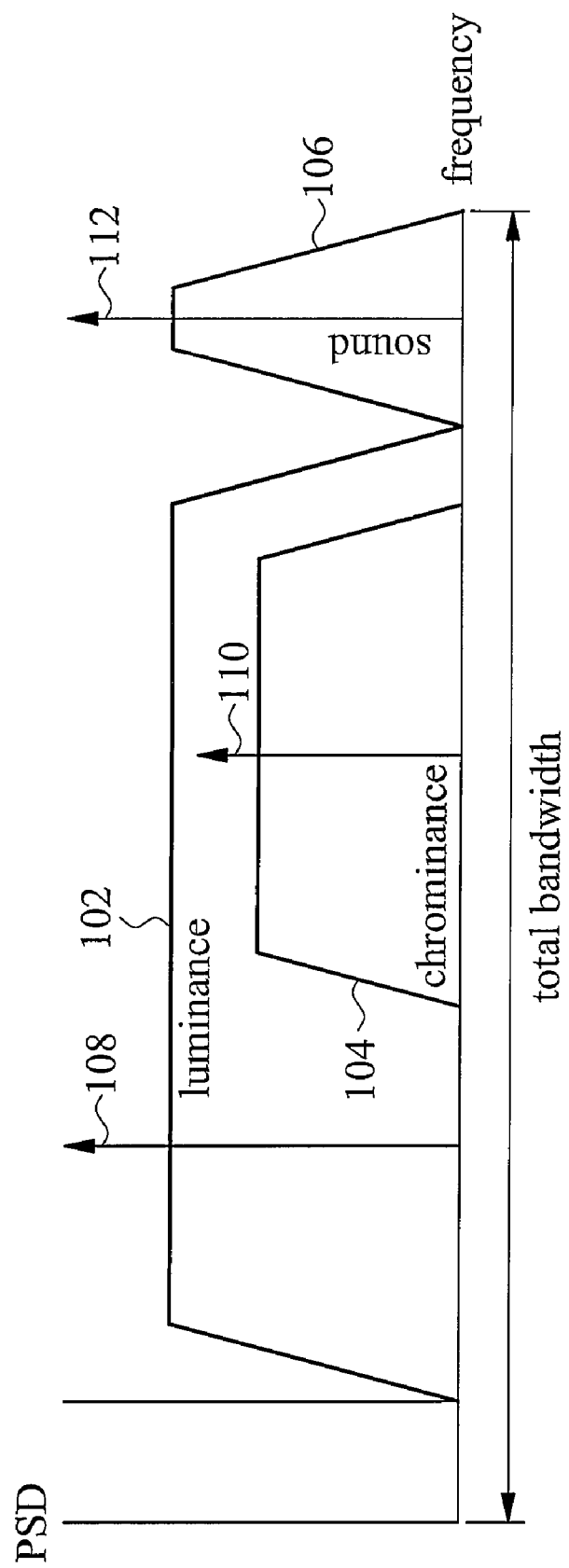
FIG. 1 is a typical form of a power spectrum density (PSD) of a TV channel.

FIG. 1 is a typical form of a power spectrum density (PSD) of a TV channel. A TV channel occupies a total bandwidth such as 6 MHz for the NTSC standard and 8 MHz for the PAL and SECAM standards. The TV signal comprises a sound signal 106 and a video signal comprising a luminance signal 102 and a chrominance signal 104. The luminance signal 102 contains brightness information of the video signal, while the chrominance signal 104 contains color information of the video signal. The luminance signal 102, which is amplitude-modulated with a video carrier 108 (also referred to as luminance carrier), is transmitted above the lower bound of the channel. Like most amplitude modulated signals, the luminance signal 102 generates two sidebands, one above the video carrier 108 and the other below. The entire upper sideband is transmitted, but only part of the lower sideband, known as a vestigial sideband, is transmitted. The chrominance signal 104 is quadrature-amplitude-modulated with a suppressed color carrier 110 (also referred to as chrominance carrier). The highest part of the channel contains the sound signal 106, which is frequency-modulated with a sound carrier 106, making it compatible with the sound signals broadcasted by FM radio stations.

Figure 2:
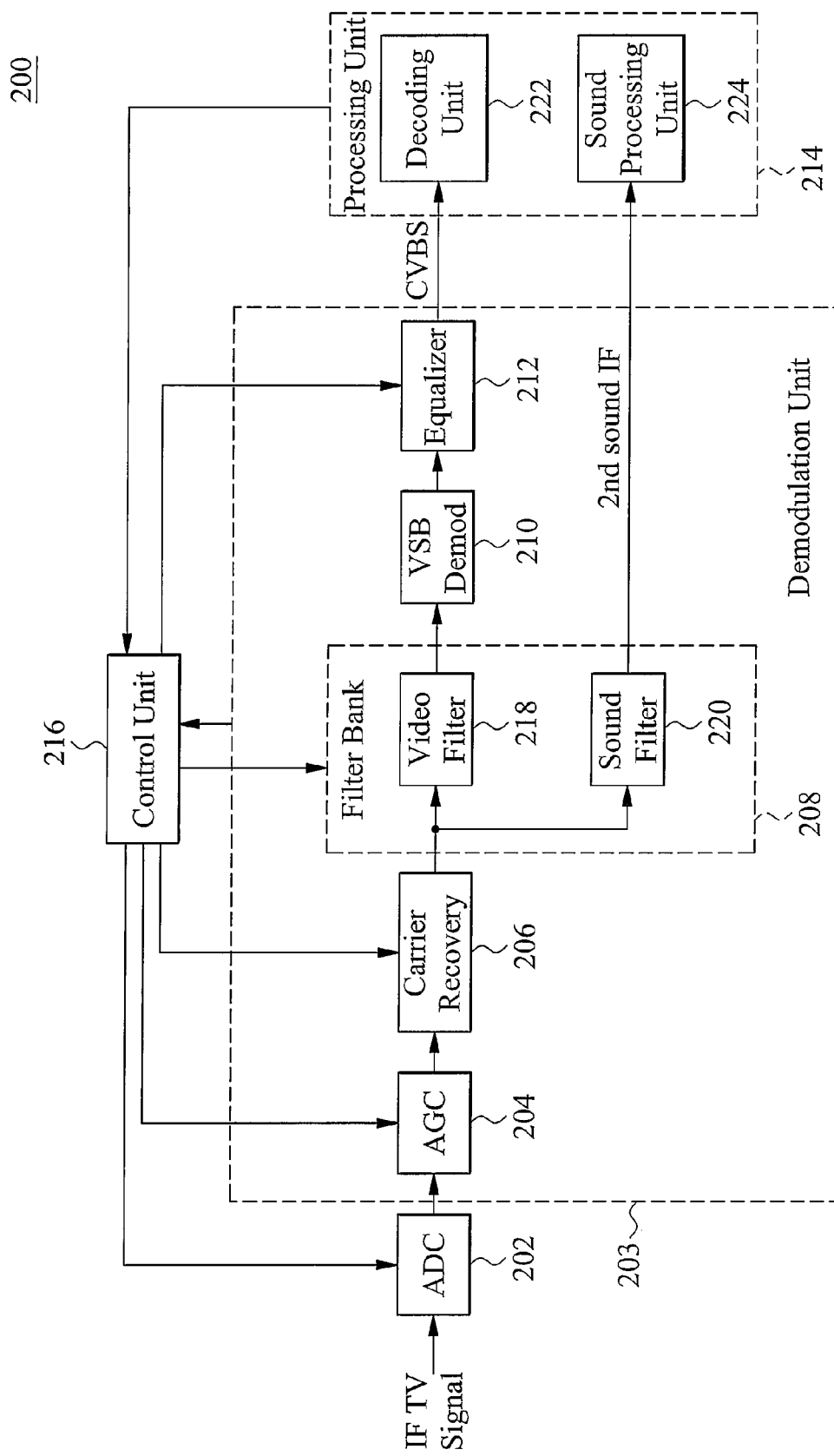
FIG. 2 is an embodiment of a digitized analog TV signal processing system 200 according to the invention.

FIG. 2 is an embodiment of a digitized analog TV signal processing system 200 according to the invention. The digitized analog TV signal processing system 200 comprises an analog-to-digital converter (ADC) 202, a demodulation unit 203, a processing unit 214, and a control unit 216. The digitized analog TV signal processing system 200 can further comprise a tuner (not shown) configured to shift an analog TV signal modulated with a radio-frequency (RF) video carrier to an intermediate-frequency (IF) TV signal comprising a video signal and a sound signal, wherein the IF is much lower than the RF carrier. The demodulation unit 203, comprising an automatic gain controller (AGC) unit 204, a carrier recovery unit 206, a filter bank 208, a vestigial sideband (VSB) demodulator 210, and an equalizer 212, can demodulate the video signal as a composite video baseband signal (CVBS). It should be noted that the demodulation unit 203 demodulates the TV signal according to the modulation scheme of a monochrome TV system (e.g., system B or system N), while the processing unit 214 decodes the video signal and demodulates and/or decodes the sound signal according to an analog color TV system (e.g. NTSC, SECAM, or PAL). The demodulation unit 203 may further generate a signal quality indicator during and/or the demodulation and forward it to the control unit 216. The ADC 202 performs IF-sampling and can sample the IF TV signal at a sampling rate to convert the IF TV signal to a digital form. The AGC unit 204 can adjust the dynamic range of the IF TV signal. For example, the AGC unit 204 can calculate detect the peak level of the input IF TV signal and then feed it back to adjust the gain to an appropriate level, thus prevents IF signal clipping after ADC. The carrier recovery unit 206 may be a phase locked loop (PLL) circuit that locks frequency and phase of the video carrier for further synchronous demodulation. The filter bank 208 may comprise a video filter 218 and a sound filter 220 to separate the video signal and the sound signal from the IF TV signal, and forward the video signal to the VSB demodulator 210 and forward the sound signal (i.e., 2nd sound IF) to the sound processing unit 214. The video filter 218 and the sound filter 220 are both band-pass filter (BPF) but with different passband centers that can filter out undesired frequency components and separate the video and sound signals. The VSB demodulator 210 can convert the vestigial sideband signal (i.e. the luminance signal of the video signal) to a double-sideband signal, which is called the composite video baseband signal (CVBS). The equalizer 212 can shape the frequency response of CVBS to alleviate possible waveform overshoot/distortion introduced by TV transmitter, channel, and receiver. The CVBS is then fed to the processing unit 214. It is noted that the order of the filter bank 208, the VSB demodulator 210, and the equalizer 212 can be exchanged. The processing unit 214 can comprise a decoding unit 222 and a sound processing unit 224 to decode the video signal and demodulate and/or decode the sound signal, according to a standard type such as the NTSC standard, the SECAM standard, or the PAL standard. The CVBS is a video signal comprising a chrominance signal, a luminance signal, a color burst, and horizontal and vertical sync pulses. The color burst is a signal used to keep the color subcarrier synchronized in the chrominance signal. By synchronizing an oscillator with the color burst at the beginning of each scan line, a television receiver is able to restore the suppressed carrier of the chrominance signal, and in turn decode the color information. The horizontal sync pulse is used to indicate the beginning of a scan line, and the vertical sync pulse is used to indicate the beginning of a frame. The decoding unit 222 can decode the CVBS according to the used standard type and the signal levels of the color burst and the sync pulses, and may measure the signal quality (such as the signal-to-noise ratio (SNR) estimation of CVBS or non-standard signal format indication). The sound processing unit 224 can recover the sound carrier of the sound signal, demodulate/decode the sound signal, and may measure the signal quality of the sound signal. The processing unit 214 may further generate a signal quality indicator according to the decoded video signal, video signal under decoding, processed sound signal, sound signal under processing, or a combination thereof, and forward the signal quality indicator to the control unit 216. The signal quality indicator may also be generated by the control unit 216 according to the decoded video signal, video signal under decoding, the demodulated video signal, the video signal under demodulation, processed sound signal, sound signal under processing, or a combination thereof, which are transmitted to the control unit 216 by the demodulation unit 203 or the processing unit 214. The control unit 216 can generate one or more feedback signals to control the ADC 202, the AGC unit 204, the carrier recovery unit 206, the filter bank 208, the equalizer 212, and the processing unit 214 according to the signal quality indicator. The control unit 216 may be implemented via hardware, software, firmware, or a combination thereof.

Figure 3A:
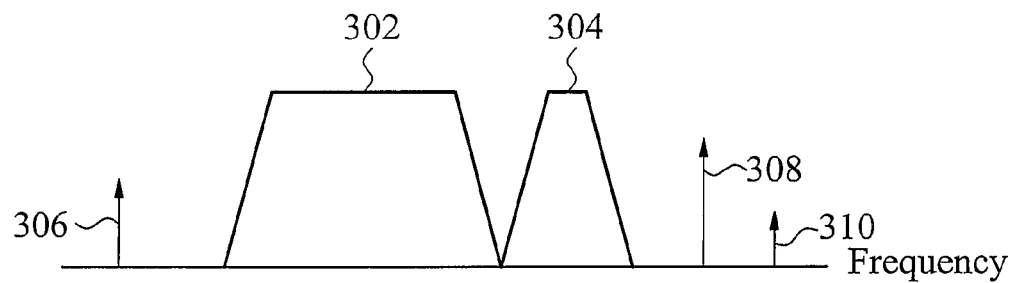
FIG. 3A-3C shows an example of different sampling rates.
Figure 3B:
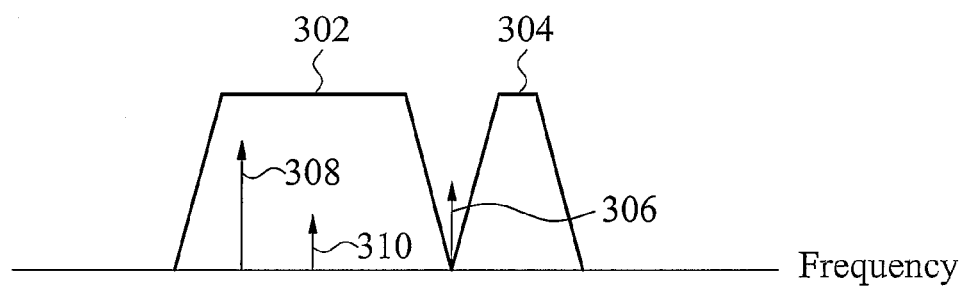
Figure 3C:
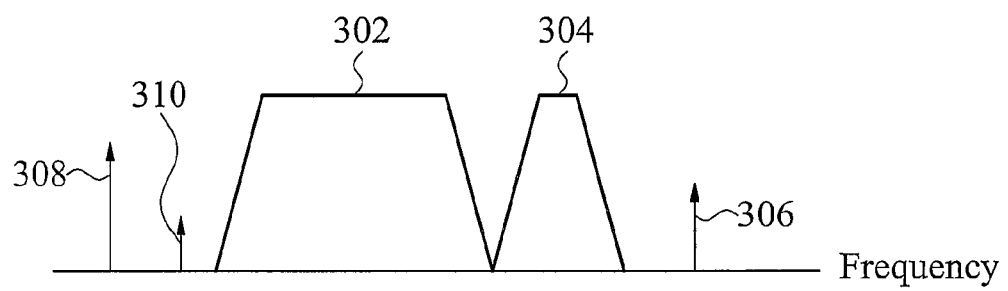

The control unit 216 can control the sampling rate of the ADC 202 to prevent adjacent channel interference (ACI). FIGS. 3A-3C shows an example of different sampling rates. FIG. 3A is the original IF spectrum comprising a video signal 302, a sound signal 304 of a TV channel, and ACIs 306, 308, and 310. Referring to FIG. 3A, the interferences 306-310 does not interfere with the video signal 302 and the sound signal 304, because the spectrum of the TV channel is not overlapped with the interferences 306-310. FIG. 3B shows an IF spectrum sampled with a sampling rate F1, wherein the interferences 308-310 are overlapped with the spectrum of the video signal 302 because of an aliasing effect. Accordingly, when the processing unit 214 detects that the signal quality of the video signal is bad, the problem may result from the aliasing effect and the processing unit 214 may output a signal quality indicator to the control unit 216 to generate a feedback signal to the ADC 202 to change the sampling rate. Next, the processing unit 214 will check if the signal quality of the video signal is improved; if not, the sampling rate of the ADC 202 will be changed several times until the processing unit 214 detects the best signal quality of the video signal. FIG. 3C shows an IF spectrum sampled with another sampling rate F2 after the ADC 202 receives the feedback signal, and the interference 306-310 are separate from the spectrum of the video signal 302 and the sound signal 304. It should be noted that the sampling rate F2 may be larger or less than the sample rate F1.

Figure 4A:
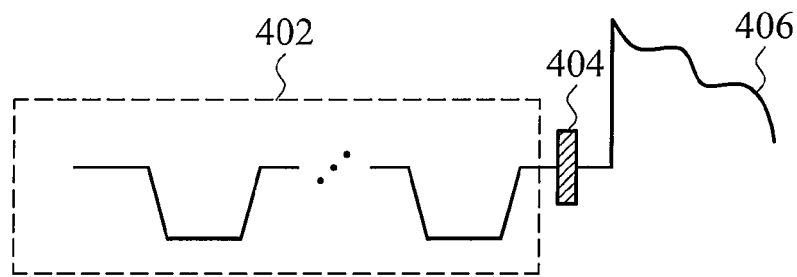
FIG. 4A shows an example of a standard CVBS signal in time domain.
Figure 4B:
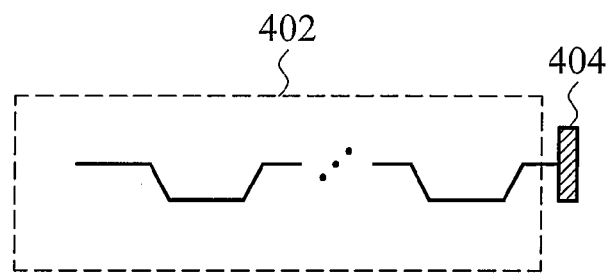
FIGS. 4B and 4C shows two possible kinds of nonstandard reference signals.
Figure 4C:
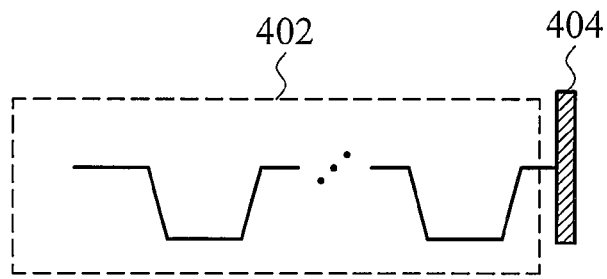

The control unit 216 can control the AGC unit 204 to dynamically adjust the reference signal levels. FIG. 4A shows an example of a standard CVBS in time domain. The signal levels of sync pulses 402 (e.g., horizontal or vertical sync pulses) and a color burst 404 can be used as reference signals for the AGC unit 204 to compensate for the signal level of the video signal 406, since the signal levels of the sync pulses 402 and the color burst 404 have known signal levels. However, the signal levels of the sync pulse 402 and the color burst 404 may not be transmitted as the same as the standard reference signals. FIGS. 4B and 4C shows two possible kinds of non-standard reference signals. Referring to FIG. 4B, the color burst 404 has a standard signal level as FIG. 4A but the sync pulses 402 have nonstandard signal levels less than those of the sync pulses in FIG. 4A. Referring to FIG. 4C, the sync pulses 402 have standard signal levels as FIG. 4A but the color burst 404 has a nonstandard signal level larger than that of the color burst in FIG. 4A. When the processing unit 214 detects that the signal levels of the reference signals are different from the standard ones, the processing unit 214 can feedback a signal quality indicator indicating that the reference signals are not standard signals to the control unit 216. The control unit 216 can generate a signal to the AGC unit 204 to modify the target reference signal levels of the reference signals.

Figure 5A:
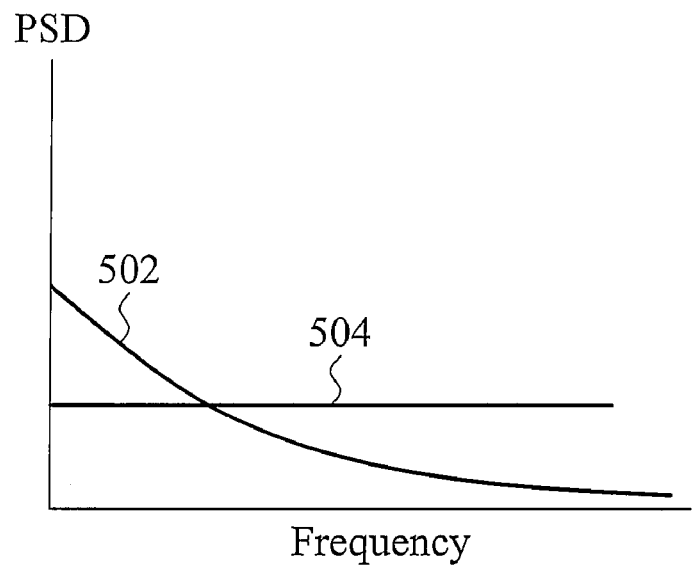
FIG. 5A shows an example of a baseband CVBS spectrum with a low SNR.
Figure 5B:
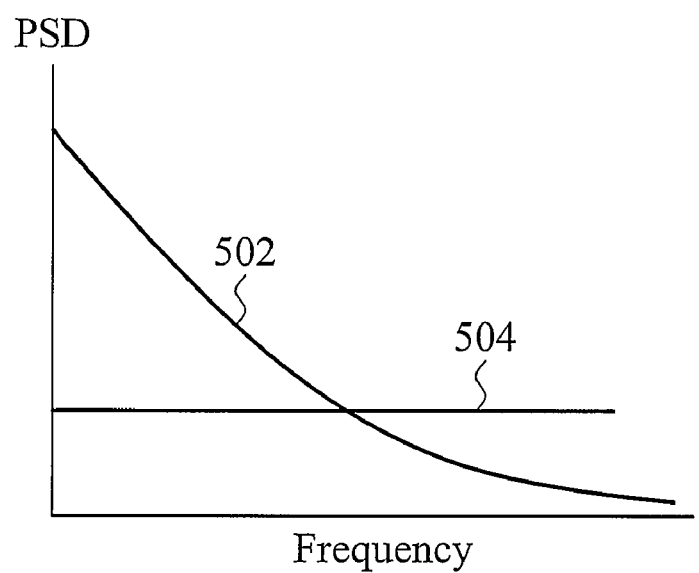
FIG. 5B shows another example of the baseband CVBS spectrum with a high SNR.

The signal quality indicator generated by the processing unit 214 can comprise a signal-to-noise ratio (SNR) of the video signal. FIG. 5A shows an example of a baseband CVBS spectrum 502 with a low SNR corresponding to a noise spectrum 504, while FIG. 5B shows another example of the baseband CVBS spectrum 502 with a high SNR corresponding to the noise spectrum 504. It is known in the art that the CVBS is mostly in the low-frequency band, while the noise spectrum is uniformly distributed. Accordingly, referring to FIG. 2 and FIG. 5A, the control unit 216 can generate a feedback signal to the video filter 218 to reduce the bandwidth of the video filter 218 (and/or generate another feedback signal to the equalizer 212 to modify the frequency response of the equalizer 212) to reject more high-frequency noise at the expense of the high-frequency component of the CVBS signal when the SNR is lower than a first threshold. On the contrary, referring to FIG. 5B, the control unit 216 can generate a feedback signal to the video filter 218 to increase the bandwidth of the video filter 218 (and/or generate another feedback signal to the equalizer 212 to modify the frequency response of the equalizer 212) to reserve more high-frequency component of the CVBS when the SNR is higher than a second threshold. In a preferred embodiment, the second threshold can be larger than the first threshold to ensure that the SNR is good enough.

Moreover, referring to FIG. 2, when the decoding unit 222 detects that the SNR of the CVBS is low, the AGC unit 204 and the carrier recovery unit 206 are easily interfered by noise and results in incorrect operations. Accordingly, the control unit 216 can output a feedback signal to the AGC unit 204 to lower the loop tuning speed of the AGC unit 204 and/or output another feedback signal to the carrier recovery unit 206 to reduce the loop bandwidth of the carrier recovery unit 206 when the SNR is lower than a third threshold. On the contrary, the control unit 216 can output a feedback signal to the AGC unit 204 to increase the loop tuning speed of the AGC unit 204 and/or output a feedback signal to the carrier recovery unit 206 to increase the loop bandwidth of the carrier recovery unit 206 when the SNR of the video signal 302 is larger than a fourth threshold. In a preferred embodiment, the fourth threshold can be larger than the third threshold to ensure that the SNR is good enough.

The signal quality indicator generated by the processing unit 214 can also comprise a SNR of the sound signal. When the sound processing unit 224 detects that the SNR of the sound signal is lower than a threshold, which may result from the high-frequency component of the video signal or the ACI, the control unit 216 can generate a feedback signal to the filter bank 208 (and/or generate another feedback signal to the equalizer 212) to suppress the video signal or the ACI. Additionally, the sound carrier of the sound signal may be away from a presumed sound carrier of the standard type, and the sound filer 220 may filter out the desired sound signal because the passband center of the sound filter 220 still locks at the presumed sound carrier. Therefore, the signal quality indicator generated by the processing unit 214 can also comprise a signal quality indicator indicating that the received sound carrier is away from the presumed sound carrier, and the control unit 216 can generate a feedback signal to the sound filter 220 to shift the passband center of the sound filter 220 to the received sound carrier.

Additionally, the decoding unit 222 may detect a waveform overshoot of the video signal. The processing unit 214 can output a signal quality indicator indicating the waveform overshoot to the control unit 216, and the control unit 216 can output a feedback signal to the equalizer 212 to attenuate high frequency video component to reduce the waveform overshoot, thereby preventing signal saturation of the CVBS.

In one specific embodiment, the decoding unit 222 may detect that the decoded video signal is unrecognizable or just a meaningless noise signal. This problem may result from two reasons; one is due to the false lock of the carrier recovery unit 206, and the other is due to the incorrect standard type used in the demodulation unit 203. Accordingly, the processing unit 214 can output a signal quality indicator indicating that the decoded video signal is unrecognizable to the control unit 216, and the control unit 216 can generate a feedback signal to the carrier recovery unit 206 to reset the parameters of the carrier recovery unit 206 to lock the correct IF, and/or generate another feedback signal to the demodulation unit 203 to change to another standard type (e.g. the standard type is changed to B, D, G, H, I, K, L, M, N etc).

In another specific embodiment, the decoding unit 222 may detect a linear distortion between the luminance signal and the chrominance signal of the decoded video signal. For example, the decoding unit 222 may detect a group delay or a large energy difference between the luminance signal and the chrominance signal. Accordingly, the processing unit 214 can output a signal quality indicator indicating the group delay or the energy imbalance to the control unit 216, and the control unit 216 can output a feedback signal to the equalizer 212 to shape the frequency response of the equalizer 212 to compensate for the group delay or the energy imbalance.

The signal quality indicator may further be generated during and/or the demodulation of the demodulation unit 203, the control unit 216 may further be configured to adjust the decoding unit 222 according to the signal quality indicator. For example, as received RF signal is weak, the decoding unit 222 may use some video noise reduction scheme to improve synchronization efficiency by RSSI (received signal strength indicator) provided by demodulation unit 203.

While the invention has been described by way of examples and in terms of preferred embodiments, it is to be understood that the invention is not limited thereto. Any variation or modification can be made by those skilled in art without departing from the spirit or scope of the invention. Therefore, the scope of the appended claims should be accorded the broadest interpretation to encompass all such modifications and similar arrangements.

What is claimed is:

1. A digitized analog television signal processing system, comprising:
    an analog-to-digital converter configured to sample a television signal comprising a video signal;
    a demodulation unit configured to demodulate the video signal, wherein the television signal further comprises a sound signal, the demodulation unit comprises a filter bank configured to separate the video signal and the sound signal from the television signal;
    a decoding unit configured to decode the demodulated video signal; and
    a control unit configured to adjust the demodulation unit according to a signal quality indicator generated during and/or after the decoding of the decoding unit,
    wherein the digitized analog television signal processing system further comprises a sound processing unit configured to demodulate and/or decode the sound signal, the signal quality indicator is further generated during and/or after the processing of the sound processing unit,
    wherein the signal quality indicator comprises a signal-to-noise ratio (SNR) of the video signal, the control unit is configured to make a bandwidth of the filter bank reduced when the SNR is lower than a threshold.

2. A digitized analog television signal processing system, comprising:
    an analog-to-digital converter configured to sample a television signal comprising a video signal;

a demodulation unit configured to demodulate the video signal, wherein the television signal further comprises a sound signal, the demodulation unit comprises a filter bank configured to separate the video signal and the sound signal from the television signal;

a decoding unit configured to decode the demodulated video signal; and a control unit configured to adjust the demodulation unit according to a signal quality indicator generated during and/or after the decoding of the decoding unit;

wherein the digitized analog television signal processing system further comprises a sound processing unit configured to demodulate and/or decode the sound signal, the signal quality indicator is further generated during and/or after the processing of the sound processing unit wherein when the signal quality indicator indicates that a sound carrier of the sound signal is different from a presumed sound carrier, the control unit is configured to make a passband center of the filter bank shifted from the presumed sound carrier to the sound carrier.

3. The digitized analog television signal processing system as claimed in claim 1, wherein the signal quality indicator comprises a signal-to-noise ratio (SNR) of the sound signal, the control unit is configured to make the filter bank suppress the video signal or an adjacent channel interference when the SNR is lower than a threshold.

4. The digitized analog television signal processing system as claimed in claim 1, wherein the demodulation unit demodulates the video signal according to a first standard type, when the signal quality indicator indicates that the decoded video signal is unrecognizable, the control unit is configured to make the demodulation unit demodulate the video signal according to a second standard type.

5. The digitized analog television signal processing system as claimed in claim 1, wherein the analog-to-digital converter samples the television signal at a first sampling rate, and the control unit is configured to make the analog-to-digital converter sample the television signal at a second sampling rate when the signal quality indicator indicates that the video signal or the sound signal has been interfered by an adjacent channel interference signal.

6. The digitized analog television signal processing system as claimed in claim 1, wherein the demodulation unit further comprises a carrier recovery unit configured to lock a video carrier of the video signal at an intermediate frequency, and the control unit is configured to make a loop bandwidth of the carrier recovery unit controlled according to the signal quality indicator.

7. The digitized analog television signal processing system as claimed in claim 6, wherein the control unit is configured to make the loop bandwidth of the carrier recovery unit reduced when the SNR is lower than a threshold.

8. The digitized analog television signal processing system as claimed in claim 6, wherein when the signal quality indicator indicates that the video carrier is not locked at the intermediate frequency, the control unit is configured to make parameters of the carrier recovery unit reset.

9. The digitized analog television signal processing system as claimed in claim 1, wherein the demodulation unit comprises an equalizer configured to shape a frequency response of the television signal, and the control unit is configured to control the equalizer according to the signal quality indicator.

10. The digitized analog television signal processing system as claimed in claim 9, wherein the control unit is configured to make the equalizer reject a high-frequency noise when the SNR is lower than a threshold.

11. The digitized analog television signal processing system as claimed in claim 9, wherein when the signal quality indicator indicates an energy imbalance between a luminance signal and a chrominance signal of the television signal, the control unit is configured to make the equalizer compensate for the energy imbalance.

12. The digitized analog television signal processing system as claimed in claim 9, wherein when the signal quality indicator indicates a group delay between a luminance signal and a chrominance signal of the television signal, the control unit is configured to make the equalizer compensate for the group delay.

13. The digitized analog television signal processing system as claimed in claim 9, wherein when the signal quality indicator indicates a waveform overshoot of the television signal, the control unit is configured to make the equalizer reduce the waveform overshoot.

14. The digitized analog television signal processing system as claimed in claim 1, wherein the demodulation unit comprises an automatic gain controller configured to control a dynamic range of the television signal, and the control unit is configured to control a loop tuning speed of the automatic gain controller according to the signal quality indicator.

15. The digitized analog television signal processing system as claimed in claim 14, wherein the control unit is configured to make the automatic gain controller reduce the loop tuning speed of the automatic gain controller when the SNR is lower than a threshold.

16. The digitized analog television signal processing system as claimed in claim 14, wherein when the signal quality indicator indicates that a signal level of a reference signal of the television signal is different from a standard signal level, the control unit is configured to make the automatic gain controller modify the signal level of the reference signal to the standard signal level.

17. The digitized analog television signal processing system as claimed in claim 14, wherein the demodulation unit further comprises a carrier recovery unit configured to lock a video carrier of the video signal at an intermediate frequency, and the control unit is configured to control a loop bandwidth of the carrier recovery unit according to the signal quality indicator.

18. The digitized analog television signal processing system as claimed in claim 1, wherein the signal quality indicator is further generated during and/or the demodulation of the demodulation unit, the control unit is further configured to adjust the decoding unit according to the signal quality indicator.

* * * * *